Nov. 28, 1967

C. J. MILAZZO 3,355,008

ACCUMULATING TRANSFER CONVEYOR

Filed July 1, 1966

INVENTOR.
Carl J. Milazzo
BY
Christel & Bean
ATTORNEYS.

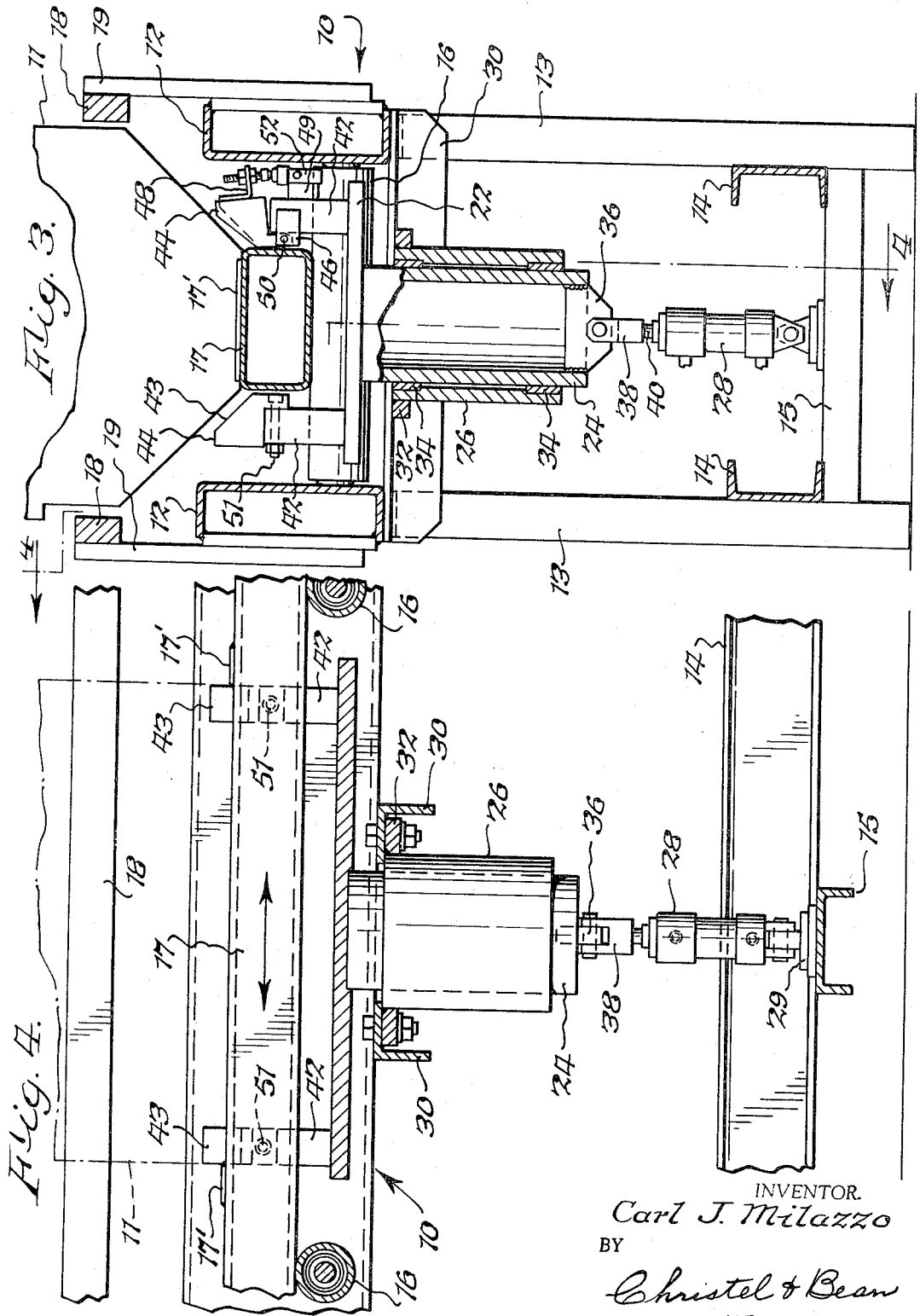

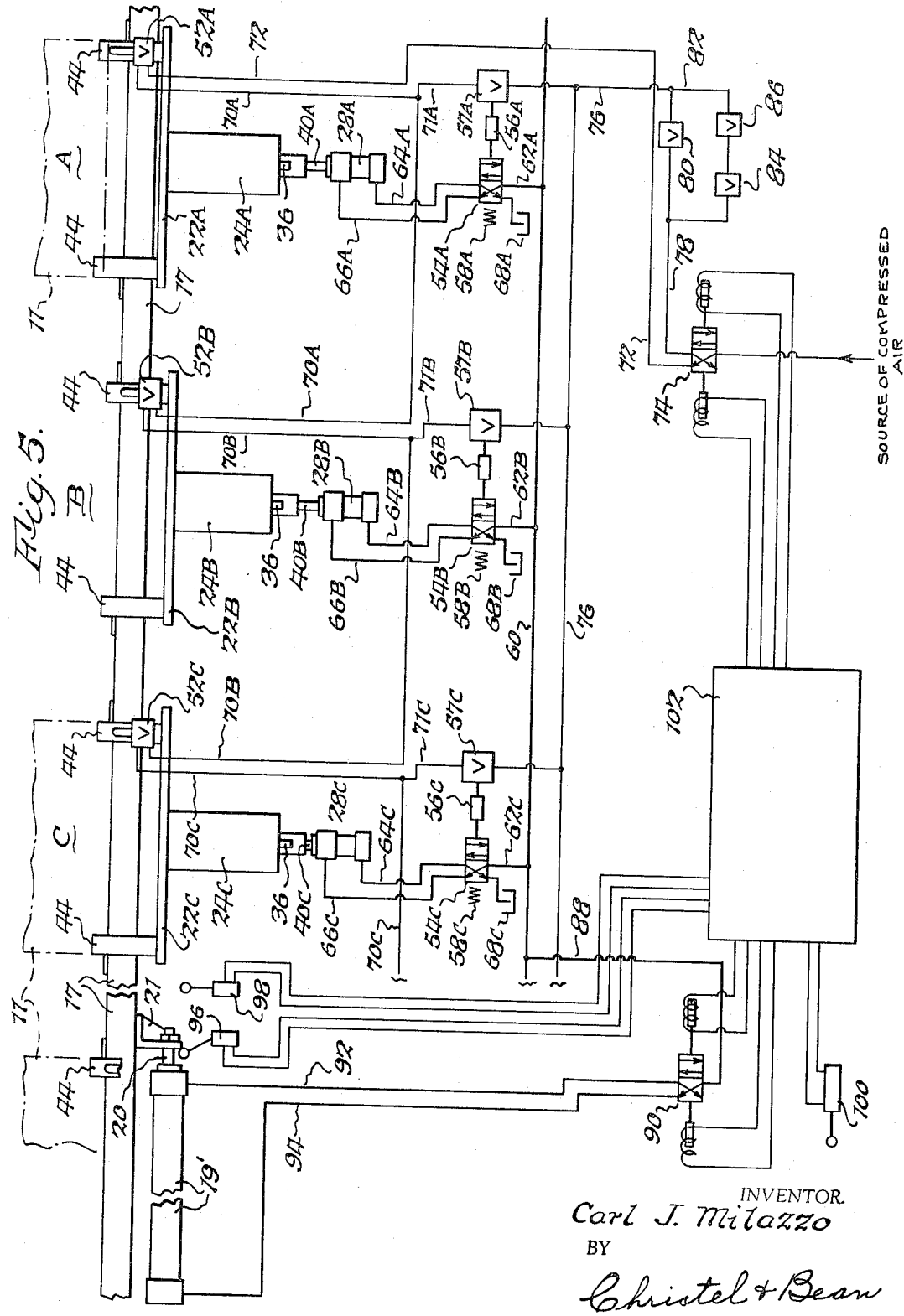

United States Patent Office 3,355,008
Patented Nov. 28, 1967

3,355,008
ACCUMULATING TRANSFER CONVEYOR
Carl J. Milazzo, Tonawanda, N.Y., assignor to Hohl Machine & Conveyor Co., Inc., Buffalo, N.Y.
Filed July 1, 1966, Ser. No. 562,356
10 Claims. (Cl. 198—219)

ABSTRACT OF THE DISCLOSURE

A reciprocating transfer bar advances articles to successive positions along the conveyor. Hydraulically operated lifting tables are provided at each position and lift the articles from the transfer bar at the end of each transfer stroke. Certain tables are selectively maintained in raised position by a pneumatic control system arranged to control operation of the lifting tables to prevent advance of the articles thereon while other tables are lowered to deposit their articles on the transfer bar for advancement. The selection is made by article sensors at each position, which sensors operate in response to the presence of an article blocking advancement of preceding articles to accumulate articles in preceding positions behind a blocking article and to preclude advancement of the blocked article.

---

This invention relates generally to the conveyor art and in particular to a transfer conveyor of the accumulating type.

Customarily, articles are transferred by conveyors of the non-accumulating type. Such conveyors require continuous removal of articles from the discharge end to avoid jamming and article spill-over. When removal is not continuous, the conveyor frequently must be shut down. This interrupts not only the conveyor operation but also the preceding operations leading to the conveyor, notwithstanding that there may be space available for additional articles on the conveyor during such shut down.

Accumulating transfer conveyors have been developed, an example of which is the pneumatically operated and controlled conveyor illustrated in my pending patent application Ser. No. 524,320 filed Feb. 1, 1966, now Patent No. 3,322,259, issued May 30, 1967. Pneumatic bellows are therein employed to lift and lower an article relative to the conveyor as part of the accumulating mode of operation. In addition to its accumulating characteristic, that conveyor has the further advantage that the articles are lifted and carried, instead of being slid along the conveyor.

However, in certain instances substantially unlimited lifting capacity is required to lift unusually heavy articles. Since the air pressure normally available in manufacturing plants is approximately 60 p.s.i., it is apparent that larger and more unwieldy lifting apparatus, or supplemental compressor equipment providing larger air pressure, or both would be necessary, to pneumatically lift heavy articles on the accumulating conveyor. Aside from this, it is desirable and sometimes essential to provide a smooth raising and lowering action, where delicate articles are conveyed and accumulated. Also the initiation of such action often must be substantially instantaneously responsive to a command signal. Air, while entirely suitable for many lifting purposes, is compressible and therefore is not instantaneously responsive. Moreover, air also is subject to pulsations and thus inhibits smooth response.

Accordingly, it is a primary object of the present invention to provide a relatively simple and inexpensive accumulating transfer conveyor of general utility having the capacity to handle unusually heavy articles.

It is another object of the present invention to provide the foregoing in a conveyor affording smooth handling of the articles as they advance and accumulate.

It is also an object of the present invention to provide an accumulating transfer conveyor which combines the advantages of a pneumatic control system with the advantages of a hydraulic lifting system.

It is another object of the present invention to provide an accumulating transfer conveyor having the foregoing characteristics and readily adaptable to common, existing power sources.

Various other novel features and advantages inherent in the accumulating transfer conveyor construction of the present invention are pointed out in detail in conjunction with the following description and accompanying drawing illustrating a typical embodiment of the invention. It is to be understood that such embodiment is by way of example only and to illustrate the principles of the present invention, the scope of which is limited only as defined in the appended claims.

FIG. 3 is a transverse sectional view thereof taken about on line 3—3 of FIG. 1;

Figure 1:
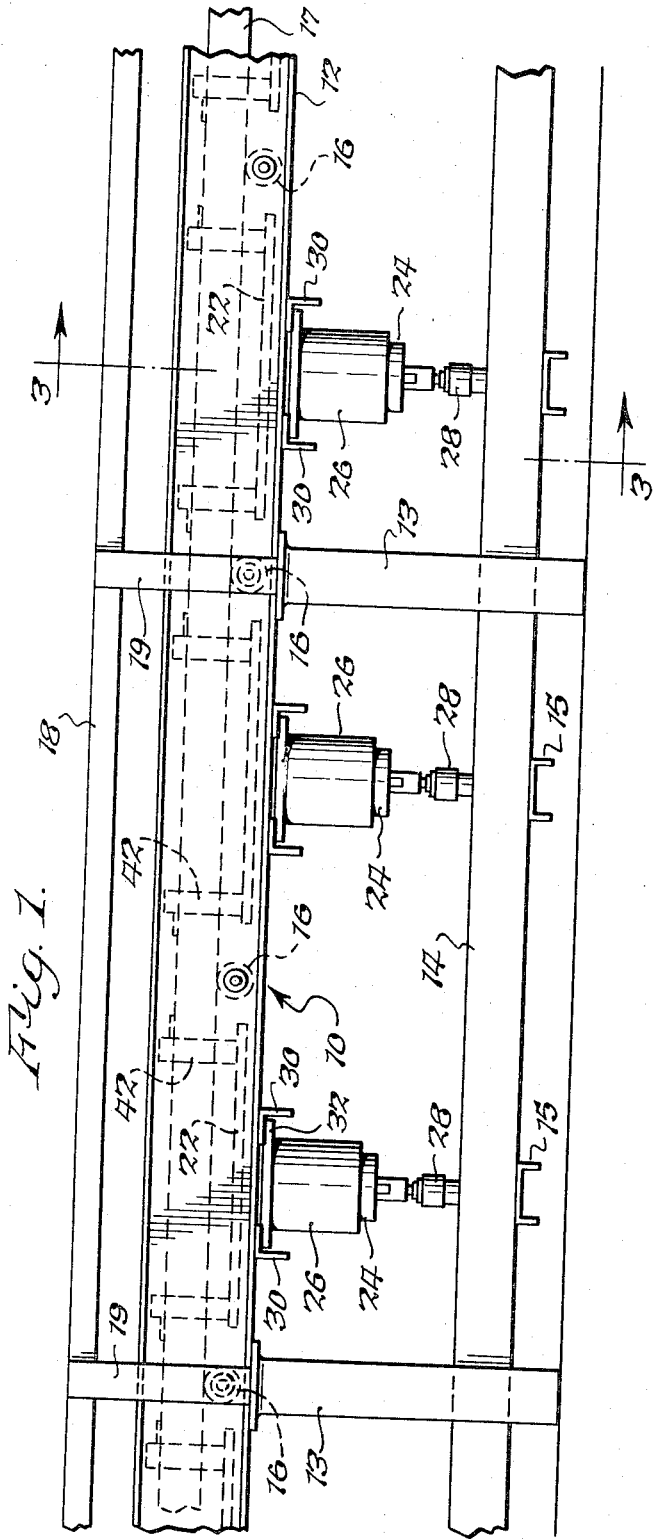
FIG. 1 is a fragmentary view in side elevation of an intermediate portion of a conveyor embodying the principles of the present invention.
Figure 2:
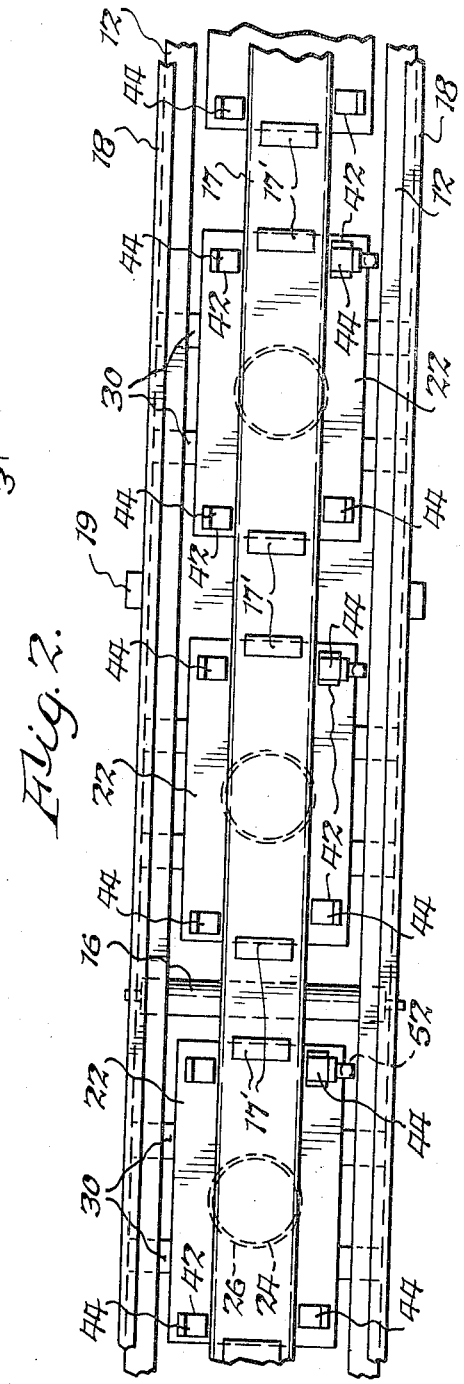
FIG. 2 is a fragmentary top plan view of the conveyor of FIG. 1.

FIG. 4 is a fragmentary longitudinal sectional view thereof taken about on line 4—4 of FIG. 3 and showing one article rest position with an article on the conveyor shown in phantom; and FIG. 5 is a schematic illustration of a fluid control circuit for the conveyor of the present invention, showing three illustrative article rest positions with a fourth position broken away to illustrate the control circuit accompanying a conveyor advancing means.

Referring now in detail to the illustrative embodiment of the present invention depicted in the accompanying drawings, there is shown an accumulating transfer conveyor, generally designated 10, intermittently adapted to advance articles 11 (FIGS. 3–5) between successive article rest positions from a conveyor input to a discharge station, not shown. Conveyor 10 is particularly adapted to convey engine blocks having truncated V-shaped undersides although the invention is in no way limited thereto. Conveyor 10 comprises a base frame including two transversely spaced side channel members 12 extending the length of the conveyor and supported by a plurality of longitudinally spaced uprights 13. Two transversely opposed channel members 14 are secured to respective lower interior portions of uprights 13 in parallel relation to members 12. Cross channel members 15 extend between uprights 13 below channel members 14 at longitudinally spaced positions along conveyor 10 each member 15 providing support for an article lifting means at an article rest position as will appear presently.

A plurality of transverse rollers 16 are longitudinally spaced apart along conveyor 10 with their opposite ends journaled on lower portions of channel members 12, for supporting a reciprocating article transfer means including a tubular, box-sectioned shuttle bar 17 which extends substantially the length of conveyor 10. Shuttle bar 17 is adapted to support articles 11 between longitudinally spaced plates 17' and to advance the articles between successive article rest positions within longitudinally extending, transversely spaced guide rails 18 supported above members 12 by vertical supports 19. In the preferred form, shuttle bar 17 is reciprocated on rollers 16 between adjacent article rest positions by means of a hydraulic piston and cylinder arrangement, which can be of conventional design, to intermittently advance each article along conveyor 10 from one article rest position to the next succeeding rest position. Such arrangement is illustrated in FIG. 5 and comprises a hydraulic cylinder 19' secured at one end to the base frame, by means not shown, with a piston rod 20 extending from the opposite end and connecting with a drive bracket 21 secured to shuttle bar 17.

An article lifting means is provided at each article rest position and comprises in each instance a lifting table 22 supported in position between rollers 16 and below shuttle bar 17 by a sleeve 24, the latter being journaled for vertical reciprocating movement within a sleeve housing 26 by an upstanding hydraulic cylinder 28 pivotally supported on cross channel member 15 by a bracket 29. Housing 26 is secured at its upper end to a collar 32, by welding or the like, and collar 32 is bolted to cross angle members 30 which connect between and depend from opposed lower portions of channel members 12. Housing 26 provides bearing surfaces for sleeve 24 at 34, and sleeve 24 has a bracket 36 at its lower end pivotally connected to a clevis 38 secured on the end of a piston 40 extending from hydraulic cylinder 28.

Support posts 42 are secured to lifting tables 22 adjacent each corner thereof and project upwardly on opposite sides of shuttle bar 17. An article support member 44 is secured to each post 42 with each member having an inclined cam surface 43 adapted to bear against and support the V-shaped underside of the engine block or other article. One of the members 44 is pivotally mounted about a longitudinal axis, as shown at 45 in FIG. 3, on a bracket 46 secured to that post 42. A spring angle 48 is secured to member 44 and has a lateral arm carrying an actuator 50 engaging a valve operator on a normally closed air valve 52, the latter being secured to post 42 by a bracket 49. Spring 48 biases pivoted member 44 to the full line position shown in FIG. 3 with member 44 pivoting to the dashed line position in response to the presence or sensing of an article at that position, causing member 50 to open normally closed air valve 52 for purposes which will presently appear. The remaining members 44 are rigidly secured to posts 42 by bolts 51.

A control system to operate the conveyor in an accumulating mode is schematically shown in FIG. 5 which depicts three exemplary article rest positions indicated at A, B and C, the elements thereof being correspondingly labelled and having suffixes indicative of the respective positions, it being understood that any number of such positions can be utilized depending on the desired length of the conveyor and other factors. A four-way valve 54 with an air pilot 56, hereinafter described, and a spring return 58 is provided adjacent each position with lines 64 and 66 communicating between valve 54 and respective lower and upper ends of cylinder 28. Valves 54 and air pilots 56 are of conventional contruction, such as the HPM four-way valve No. 6454A-22-01 Air Pilot Spring Return with Sub Pilot No. 1B106-157 made by HPM Division of Kochring Co., Mount Gilead, Ohio. A source of hydraulic fluid, not shown, supplies a main hydraulic feed line 60, the latter being connected in parallel with valves 54A, 54B and 54C via respective lines 62A, 62B and 62C. Return hydraulic sumps 68A, 68B and 68C are provided and communicate with respective valves 54A, 54B and 54C.

The control system includes a pneumatic control circuit which, in combination with spring returns 58, is operable to selectively shift valves 54 to admit hydraulic fluid to cylinders 28 to lift articles from shuttle bar 17 and to selectively maintain certain articles raised from shuttle bar 17 while the remaining articles are lowered and reengage the shuttle bar for advancement to a next adjacent article rest position, the latter selection being made in response to the presence of an article blocking advancement of preceding articles, thereby to accumulate articles in preceding positions behind a blocking article and to preclude advancement of the blocked article. The pneumatic control circuit includes, at each position, the air valve 52, an air shuttle valve 57 and the air pilot 56. Both valves 52 and 57 can be of known construction such as the Versa Series A, three way air valve No. Alk-3209 and Versa Shuttle Valve No. SV-3 respectively made by the Versa Corporation of Brooklyn, N.Y.

Valve 52A, 52B and 52C are connected in series via lines 70A, 70B and 70C with the latter lines respectively connecting with one side of respective air shuttle valves 57A, 57B and 57C via respective lines 71A, 71B and 71C. The valve 52 at the furthest advanced position, which normally is the conveyor discharge station, communicates with an air pressure source, not shown, through line 72 and a double solenoid operated air valve 74, it being understood that line 72 is herein connected to valve 52A for illustrative purposes only. The other side of each air valve 57 connects with a common air feed line 76, the latter connecting with the air pressure source via line 78 and solenoid operated valve 74. A pressure regulator 80 is disposed in line 78, in parallel with a bypass line 82 including a time delay air valve 84 and check valve 86 for purposes which will presently appear.

As shown in FIG. 5, cylinder 19' of the article transfer means communicates with main hydraulic feed line 60 via line 88, a four-way double solenoid operated valve 90 and lines 92 and 94 communicating between valve 90 and respective ends of cylinder 19. Limit switches 96 and 98 are secured to the base frame of the conveyor and are respectively actuated by engagement with drive bracket 21 of piston 20 when shuttle bar 17 is in its retracted and advanced positions for purposes presently described. A start switch 100 is provided to initiate the conveyor accumulating mode of operation and particularly actuates a master sequencing timer 102 which controls the pneumatic control circuit and the cyclic advance and retraction of shuttle bar 17.

All of the lifting tables 22 are raised upon initiation of the accumulating mode of operation to lift the articles from the conveyor shuttle bar 17. The following description of the lifting of the table at position A suffices to describe the lifting of tables 22 at other positions since the lifting operation is identical at each position. Actuation of switch 100 initiates the accumulating mode of operation by energizing sequencing timer 102 which then energizes a solenoid of valve 74 shifting the latter to the left, as viewed in FIG. 5, to admit air from the air pressure source through valve 74, lines 78 (line 82 being blocked by check valve 86) and 76, regulator 80, shuttle valve 57A and into air pilot 56A. Introduction of air into the latter causes valve 54A to shift to the left, as viewed in FIG. 5, against the biasing of spring 58A to admit hydraulic fluid from main hydraulic feed line 60 into the lower end of cylinder 28A via lines 62A and 64A. Piston 40A is extended to slide sleeve 24A upwardly within cylinder 26 (FIG. 3; omitted from FIG. 5 for clarity) with members 44 engaging the underside of the article to lift the same sufficiently to disengage it from shuttle bar 17. In the lifted position table 22A is spaced below shuttle bar 17 in an non-interfering position. The upper end of cylinder 28A is vented through line 66A and valve 54A into sump 68A. Since valves 57A, 57B and 57C are connected in parallel with line 76, all lifting tables 22 are initially raised substantially simultaneously, notwithstanding the presence or absence of an article at the respective positions.

Assuming that there are articles at positions A and C with position B vacant, as illustrated in FIG. 5, and that an article blocks each position succeeding position A, conveyor 10 will accumulate the articles on the conveyor by advancing the articles at C and preceding positions to position B and to their next adjacent positions, respectively, with the articles at position A and succeeding positions remaining unadvanced, as follows. Sequencing timer 102 indexes to energize the other solenoid of valve 74, shifting the latter to the right as viewed in FIG. 5 to admit air from the air pressure source through line 72 to the first air valve 52A and to vent air from valves 57A, 57B and 57C via lines 76 and 82.

Member 44 at position A pivots counterclockwise as seen in FIG. 3 in response to the presence of an article thereat to open normally closed valve 52A. Air then passes through valve 52A into line 70A, line 71A, through valve 57A and into air pilot 56A causing valve 54A to maintain communication between hydraulic line 60 and the lower end of cylinder 28A. As a result, table 22A is held in lifted position, resulting in the continued disengagement of the article at position A from shuttle bar 17. Since there is no article at position B, valve 52B remains closed and cuts off air to preceding valves 52C, 57B and 57C. Springs 58B and C return their respective valves, lowering tables 22B and C and returning the article at C to bar 17.

Note that while valves 57A, 57B and 57C are vented through line 76 due to the previous shift of solenoid valve 74 to the right, such venting is not instantaneous because of the time delay introduced by valve 84, thus providing sufficient pressure in line 76 to maintain all lifting tables in the raised position long enough for air to communicate through line 72 to as many valves 57 as permitted by valves 52.

By venting line 76, the pressure on air pilots 56A, 56B and 56C is reduced and valves 54A, 54B and 54C are shifted to the right under the bias of their respective springs 58A, 58B and 58C. This exhausts the lower ends of cylinders 28A, 28B and 28C to sumps 68A, 68B and 68C respectively, and provides hydraulic fluid to the upper ends of cylinders 28A, 28B and 28C thereby lowering lifting tables 22. However, since valve 52A is open in response to the presence of the blocked article blocking position A, air passes into air pilot 56A via lines 70A and 71A causing valve 54A to be maintained in its shifted position to the left as viewed in FIG. 5. Thus table 22A remains in its raised article supporting position notwithstanding the venting of the lower side of valve 57A through line 76 which is ineffective so long as air under pressure is supplied to the upper side of valve 57A. Since air cannot pass through closed valve 52B and valves 57B and 57C are vented through line 76, valves 54B and 54C shift to the right to provide hydraulic communication between feed line 60 and the upper ends of cylinders 28B and 28C via lines 66B and 66C. Lifting tables 22B and 22C thus retract with table 22C depositing the article at C on shuttle bar 17 ready for advancement to position B.

Sequencing timer 102 then energizes a solenoid of valve 90 shifting the same to the position shown in FIG. 5 to provide hydraulic communication between line 60 and one end of cylinder 19′ via lines 88 and 94 and vent the other end of cylinder 19′ via line 92, to fully extend piston 20. Extension of piston 20 advances shuttle bar 17 and moves the article thereon to position C to position B with the raised article at position A remaining unadvanced. All articles preceding position C will also be advanced. When shuttle bar 17 is fully advanced, bracket 21 engages limit switch 98, actuating the same to cause sequencing timer 102 to energize a solenoid of valve 74 shifting the latter to the left to again provide air communication between the air pressure source and lines 78, 76. Valves 57A, 57B and 57C admit air to the respective air pilots 56A, 56B and 56C causing valve 54A to remain shifted to the left and causing valves 54B and 54C to shift to the left again. The latter shifting of valves 54B and 54C provides communication between hydraulic feed line 60 and the lower ends of cylinders 28B, 28C, raising lifting tables 22B and 22C with table 22B lifting the just advanced article at B from shuttle bar 17.

Sequencing timer 102 then energizes the other solenoid of valve 90, shifting the latter to the left to provide communication between hydraulic feed line 60 and one end of cylinder 19′ via lines 88 and 92 and to vent the other end of cylinder 19′ via line 94 to retract piston 20 and shuttle bar 17. All articles are held lifted from bar 17 as it is retracted. Bracket 21 abuts limit switch 96 upon full retraction of bar 17 and signals sequencing timer 102 to begin the transfer cycle again.

The conveyor, at this point, has completed an accumulating cycle and has advanced articles from position C and any preceding positions to position B and their next succeeding positions, respectively. The conveyor has maintained the article at position A, and succeeding positions, during such advancement and the article now at position B is blocked and becomes the blocking article since all succeeding positions are filled.

As a new advancing cycle begins, timer 102 causes valve 74 to shift to the right venting valves 57A, 57B and 57C and admitting air through valves 52A and 52B which are now open in response to the detected presence of articles at those positions. If there is no article at position C, valve 52C will be closed. The articles at positions B, A and succeeding positions will thus be maintained in the raised position with all preceding lifting tables caused to lower by venting line 76. Timer 102 then causes shuttle bar 17 to advance articles preceding position C to their next adjacent position, as before. Valve 74 then is shifted to the left to lift the advanced articles from shuttle bar 17 and simultaneously maintain the articles at positions A, B and succeeding positions raised from shuttle bar 17. Shuttle bar 17 then is retracted causing actuation of limit switch 96 whereby timer 102 causes valve 74 to shift to the right. The conveyor is now ready to begin another accumulating cycle.

By repeating the above cycle, each article is intermittently advanced until it assumes a blocking position whereupon it is raised from shuttle bar 17 and maintained in such raised position during advance of preceding articles. Thus, it is apparent that accumulation will take place until all positions are filled. Moreover, the conveyor need not be shut down even when all positions are filled, since all of the articles will be disengaged from shuttle bar 17 which continues to reciprocate for transferring of articles immediately upon unblocking.

When the article at the furthest advanced position or discharge station is taken from the conveyor, the valve 52 at such position closes and all valves 57 will be vented causing all lifting plates 22 to lower the articles supported thereon onto shuttle bar 17 for advancement. The articles are continuously intermittently advanced until an article occupies and blocks the discharge station at which time articles are accumulated behind blocking articles as hereinbefore described. Note also that the articles do not physically contact one another in order to be accumulated.

Thus, it is seen that my invention fully accomplishes its intended objects. While I have disclosed in detail but one embodiment, that has been done by way of illustration only, without thought of limitation. Timer 102 can comprise any suitable sequencing, indexing mechanism operable in the manner described, the details of such timer per se being no part of my invention.

Having fully disclosed and completely described my invention, what I claim as new is:

1. An accumulating transfer conveyor comprising reciprocating transfer means adapted to support articles at a plurality of positions and advance the same along a predetermined path from a first position to successive positions, means associated with said positions to remove articles at said positions from said transfer means, and means including article sensing means associated with said positions and operable in response to the presence of an article blocked at one of said positions to maintain such blocked article removed from said transfer means during advance of the latter along said path.

2. A conveyor according to claim 1, wherein said transfer means includes a shuttle bar and means for reciprocating said shuttle bar between adjacent positions, and wherein said removing means includes means for lifting articles from said shuttle bar.

3. A conveyor according to claim 2, wherein said lifting means are operable to lift articles from said shuttle bar at the end of the advancing stroke of said shuttle bar.

4. A conveyor according to claim 1, wherein said removing means includes a lifting member associated with each of said positions and adapted to engage articles, and fluid operated means associated with said positions and connected to said lifting member to elevate the latter and lift an article from engagement with said transfer means.

5. A conveyor according to claim 1, wherein said maintaining means comprises a fluid control circuit including valves associated with said positions, said valves being connected in series with each of said valves being arranged in controlling relation to said removing means to maintain an article removed from said transfer means.

6. A conveyor according to claim 4 wherein said maintaining means comprises a fluid control circuit including valves associated with each position, said valves being connected in series with each of said valves being arranged in controlling relation to said fluid operated means to maintain an article removed from said transfer means, and wherein said fluid operated means are hydraulically operated.

7. A conveyor according to claim 4 wherein said maintaining means comprises a fluid control circuit including valves associated with said positions, said valves being connected in series, and control means forming a portion of said control circuit operable in one condition to cause said fluid operated means to lift articles from said transfer means and operable in another condition through said valves to cause said fluid operated means to maintain a blocked article removed from said transfer means.

8. A conveyor according to claim 7 wherein said transfer means includes a transfer carriage and means for reciprocating said transfer carriage between adjacent positions.

9. A conveyor according to claim 8, including means arranged in controlling relation to said fluid circuit control means and operable in response to advancement of said carriage to shift said fluid circuit control means to said one condition.

10. A conveyor according to claim 9, including means operable in response to retraction of said carriage to shift said fluid circuit control means to said other condition.

References Cited

UNITED STATES PATENTS

| | | | |
|---|---|---|---|
| 2,010,295 | 8/1935 | Dreffein | 198—219 X |
| 2,650,696 | 9/1953 | Gedris | 198—221 |
| 3,289,821 | 12/1966 | Bosse et al. | 198—221 |

HUGO O. SCHULZ, *Primary Examiner.*

EVON C. BLUNK, *Examiner.*

R. J. HICKEY, *Assistant Examiner.*